United States Patent
Molina et al.

(10) Patent No.: US 11,867,302 B2
(45) Date of Patent: Jan. 9, 2024

(54) VALVE FOR HYDRAULIC CONTROL AND BALANCING OF FLUID FLOW RATE

(71) Applicant: Giacomini S.p.A., San Maurizio d'Opaglio (IT)

(72) Inventors: Samuele Molina, San Maurizio d'Opaglio (IT); Andrea Zuffellato, San Maurizio d'Opaglio (IT); Marco Rosa Brusin, San Maurizio d'Opaglio (IT); Paolo Arrus, San Maurizio d'Opaglio (IT)

(73) Assignee: GIACOMINI S.P.A., San Maurizio d'Opaglio (IT)

( * ) Notice: Subject to any disclaimer, the term of this patent is extended or adjusted under 35 U.S.C. 154(b) by 0 days.

(21) Appl. No.: 17/431,870

(22) PCT Filed: Feb. 20, 2020

(86) PCT No.: PCT/IB2020/051434
§ 371 (c)(1),
(2) Date: Aug. 18, 2021

(87) PCT Pub. No.: WO2020/170193
PCT Pub. Date: Aug. 27, 2020

(65) Prior Publication Data
US 2022/0146006 A1    May 12, 2022

(30) Foreign Application Priority Data

Feb. 21, 2019 (IT) .................. 102019000002529

(51) Int. Cl.
*F16K 15/18* (2006.01)
*F16K 15/02* (2006.01)
(Continued)

(52) U.S. Cl.
CPC ......... *F16K 15/182* (2021.08); *F16K 15/028* (2013.01); *G05D 7/014* (2013.01); *F16K 3/265* (2013.01); *F16K 3/32* (2013.01)

(58) Field of Classification Search
CPC ....... Y10T 137/7929; Y10T 137/85743; Y10T 137/86751; F16K 15/182; F16K 15/028;
(Continued)

(56) References Cited

U.S. PATENT DOCUMENTS

| 453,109 | A | * | 5/1891 | Dreisörner | .............. F16K 1/123 251/367 |
| 1,377,240 | A | * | 5/1921 | Willis | ................... F16K 5/0214 251/310 |

(Continued)

FOREIGN PATENT DOCUMENTS

| DE | 4228565 A1 | 3/1994 |
| DE | 3421653 A1 | 9/1995 |

(Continued)

OTHER PUBLICATIONS

International Search Report and Written Opinion in related application PCT/IB2020/051434 dated Jul. 28, 2020; 13 pages.

*Primary Examiner* — Craig M Schneider
*Assistant Examiner* — Frederick D Soski
(74) *Attorney, Agent, or Firm* — Mark Malek; Jonathan Staudt; Widerman Malek. PL

(57) ABSTRACT

A valve for hydraulic control of fluid flow rate, comprising: a body provided with an inlet opening, an outlet opening and an actuating opening; a rotating hollow shutter rotatively housed inside said body, said rotating shutter being configured to be crossed by a fluid and to change the passage cross-section inside the valve, in which the rotating shutter comprises at least one first opening rotatively cooperating with at least one mated second eccentric opening, said rotating shutter being configured to be manually actuatable (Continued)

inside the body so that a rotation of said first opening with respect to said second opening is matched by a variation of the fluid passage cross-section in a direction substantially coinciding with the rotation axis.

16 Claims, 9 Drawing Sheets

(51) Int. Cl.
G05D 7/01 (2006.01)
F16K 3/32 (2006.01)
F16K 3/26 (2006.01)

(58) Field of Classification Search
CPC .......... F16K 11/12; F16K 11/14; F16K 11/18; F16K 5/0421; F16K 3/26; F16K 3/246; G05D 7/014
USPC .................................. 251/310, 352, 346, 341
See application file for complete search history.

(56) References Cited

U.S. PATENT DOCUMENTS

| | | | | | |
|---|---|---|---|---|---|
| 1,532,251 | A * | 4/1925 | Lorraine | ............... | F16K 5/0421 251/192 |
| 1,883,960 | A * | 10/1932 | Koppel | .................... | F16K 7/02 251/340 |
| 1,968,391 | A * | 7/1934 | Hamilton | ............. | B05B 1/1654 239/394 |
| 2,015,024 | A * | 9/1935 | Yarnall | .................... | F16K 3/26 251/266 |
| 2,132,333 | A * | 10/1938 | Sargent | .................. | B05B 1/1654 239/394 |
| 2,138,767 | A * | 11/1938 | Matthews | ............. | F16K 5/0214 131/215.3 |
| 2,170,619 | A * | 8/1939 | Sica | ...................... | F16K 5/0214 251/183 |
| 2,210,559 | A * | 8/1940 | Albright | ................... | F16K 3/26 137/614.19 |
| 2,244,237 | A * | 6/1941 | Belknap | ................. | F16K 1/526 237/63 |
| 2,383,983 | A * | 9/1945 | Melichar | .............. | F16K 5/0414 137/625.11 |
| 2,506,098 | A * | 5/1950 | Melichar | ................ | F16K 35/04 251/297 |
| 2,552,444 | A * | 5/1951 | Nielsen | .................... | B05B 1/12 239/499 |
| 2,556,583 | A * | 6/1951 | Hinz | ...................... | F16K 3/085 251/340 |
| 2,594,173 | A * | 4/1952 | Jensen | .................. | F16K 5/0464 251/297 |
| 2,702,050 | A * | 2/1955 | Thomas | ............ | F16K 31/52466 251/162 |
| 2,755,652 | A * | 7/1956 | Shelton | .................. | F16K 11/072 251/352 |
| 2,760,754 | A * | 8/1956 | Gladstone | ............. | A01G 25/16 251/344 |
| 2,790,680 | A * | 4/1957 | Rosholt | ................. | B05B 1/1654 239/487 |
| 2,929,406 | A * | 3/1960 | Anderson | ............. | F16K 27/067 239/581.1 |
| 2,993,677 | A * | 7/1961 | Ford | ..................... | F16K 27/062 285/332.1 |
| 3,030,975 | A * | 4/1962 | Mueller | .................. | F16K 5/225 137/246.22 |
| 3,426,797 | A * | 2/1969 | Baker | .................... | F16K 3/085 251/340 |
| 3,771,765 | A * | 11/1973 | Scapes | .................. | F16K 5/0214 251/368 |
| 3,974,869 | A * | 8/1976 | Abe | ...................... | F16K 5/0271 251/317 |
| 4,011,889 | A * | 3/1977 | Smith | ..................... | F16K 3/246 137/630.19 |
| 4,098,294 | A * | 7/1978 | Woods | .................. | F16K 47/045 137/625.35 |
| 4,275,868 | A * | 6/1981 | Crone | ................... | F16K 5/0414 251/317 |
| 4,319,735 | A * | 3/1982 | Moen | ..................... | F16K 5/0428 251/317 |
| 4,331,176 | A * | 5/1982 | Parkison | ............... | F16K 47/045 137/454.6 |
| 4,365,646 | A * | 12/1982 | Sandling | ................. | F16K 43/00 251/293 |
| 4,395,018 | A * | 7/1983 | Moen | ..................... | F16K 27/065 251/900 |
| 4,406,442 | A * | 9/1983 | Bettin | ....................... | F16K 3/26 251/312 |
| 4,410,003 | A * | 10/1983 | Sandling | ............... | F16K 27/062 251/312 |
| 4,530,467 | A * | 7/1985 | Bueno | ....................... | E03C 1/08 251/352 |
| 4,557,464 | A * | 12/1985 | Gyurovits | ................. | F16K 3/08 251/312 |
| 4,564,044 | A * | 1/1986 | Biller | .................... | B67C 3/2608 137/625.22 |
| 4,577,656 | A * | 3/1986 | Beltran | ................. | F16K 5/0414 251/310 |
| 4,577,835 | A * | 3/1986 | Holycross, Jr. | ........... | F16K 3/04 251/118 |
| 4,609,177 | A * | 9/1986 | Turner | .................. | F16K 27/065 251/182 |
| 4,699,358 | A * | 10/1987 | Iqbal | ..................... | F16K 5/0407 251/117 |
| 4,700,928 | A * | 10/1987 | Marty | ................... | F16K 5/0414 251/312 |
| 4,776,565 | A * | 10/1988 | Sheen | ..................... | F16K 27/045 251/287 |
| 4,778,152 | A * | 10/1988 | Logman | ................ | F16K 5/0414 251/310 |
| 4,782,656 | A * | 11/1988 | Hansen | ................. | F01C 1/3441 60/39.6 |
| 4,794,944 | A * | 1/1989 | Henry | ................... | F16K 5/0242 251/312 |
| 4,809,949 | A * | 3/1989 | Rakieski | ............. | F16K 11/0876 251/312 |
| 4,848,403 | A * | 7/1989 | Pilolla | .................... | F16K 3/085 251/304 |
| 4,918,768 | A * | 4/1990 | DeSousa | ............... | F16K 15/148 137/854 |
| 5,076,540 | A * | 12/1991 | Murphy | ................ | F16K 5/0414 251/312 |
| 5,332,194 | A * | 7/1994 | Austin, Jr. | ........... | A61C 1/0061 251/344 |
| 5,579,815 | A * | 12/1996 | Labonte | ............. | F01M 11/0408 251/351 |
| 5,695,169 | A * | 12/1997 | Higgins | ................. | F16K 27/065 251/304 |
| 5,902,294 | A * | 5/1999 | Edwards | ................. | F16K 5/0414 604/350 |
| 6,719,273 | B1 * | 4/2004 | Yang | ........................ | B25H 3/04 251/344 |
| 7,083,071 | B1 * | 8/2006 | Crisp, III | .............. | B67D 1/0021 222/129.3 |
| 7,093,821 | B2 * | 8/2006 | Howe | ................... | B60H 1/3442 251/351 |
| 7,114,515 | B2 * | 10/2006 | Sponheimer | ............ | F16K 3/085 137/454.2 |
| 7,726,338 | B2 * | 6/2010 | Clasen | ................... | F16K 3/085 251/304 |
| 9,689,520 | B2 * | 6/2017 | Taneya | .................. | F15B 21/003 |
| 10,744,522 | B2 * | 8/2020 | Wu | ...................... | F16K 27/045 |
| 11,493,136 | B1 * | 11/2022 | Warble | ..................... | F16K 3/04 |

(56) References Cited

U.S. PATENT DOCUMENTS

| | | | |
|---|---|---|---|
| 2006/0157664 A1* | 7/2006 | Huff | F16K 5/0214 |
| | | | 251/310 |
| 2010/0122742 A1* | 5/2010 | Lin | B01D 61/10 |
| | | | 137/497 |
| 2013/0138075 A1* | 5/2013 | Lambert | A61M 39/10 |
| | | | 604/500 |

FOREIGN PATENT DOCUMENTS

| | | | | |
|---|---|---|---|---|
| GB | 1223830 A | * | 10/1969 | F16K 3/26 |
| WO | 201616848 A1 | | 10/2016 | |
| WO | 2017021789 A1 | | 2/2017 | |

\* cited by examiner

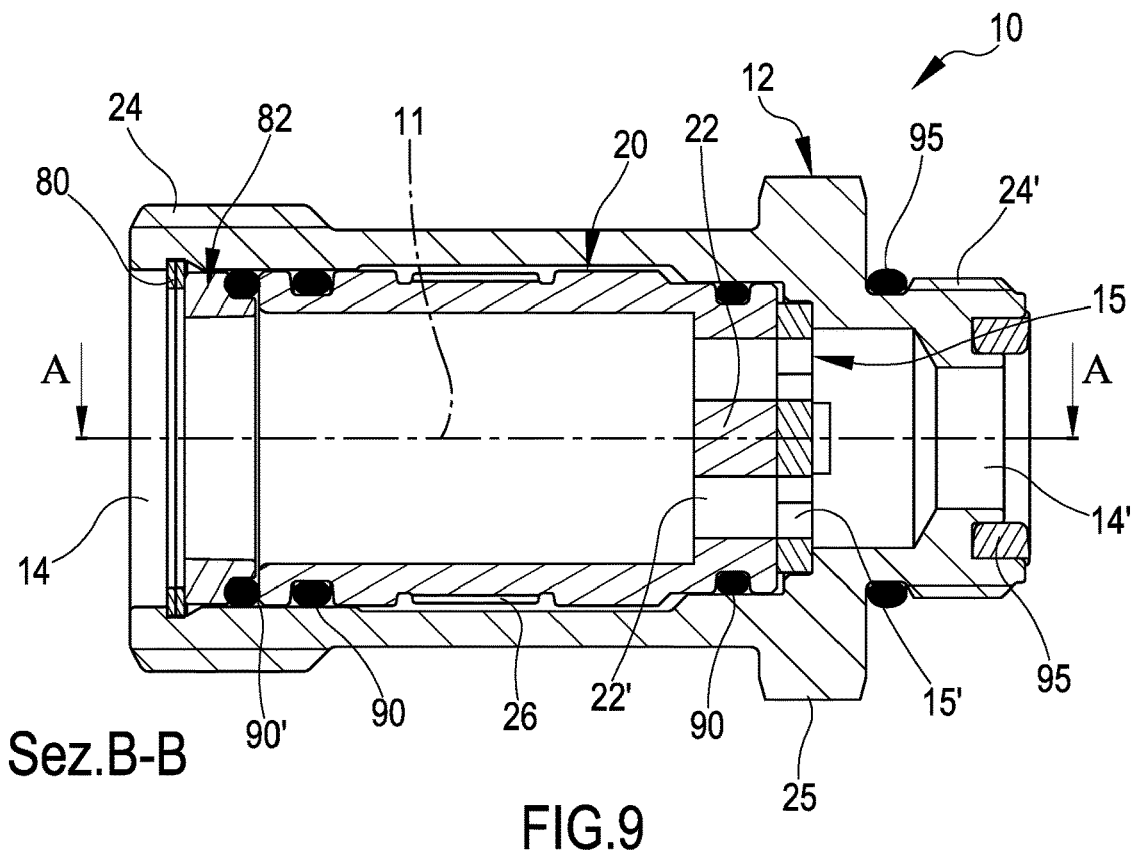
Sez.B-B  FIG.9
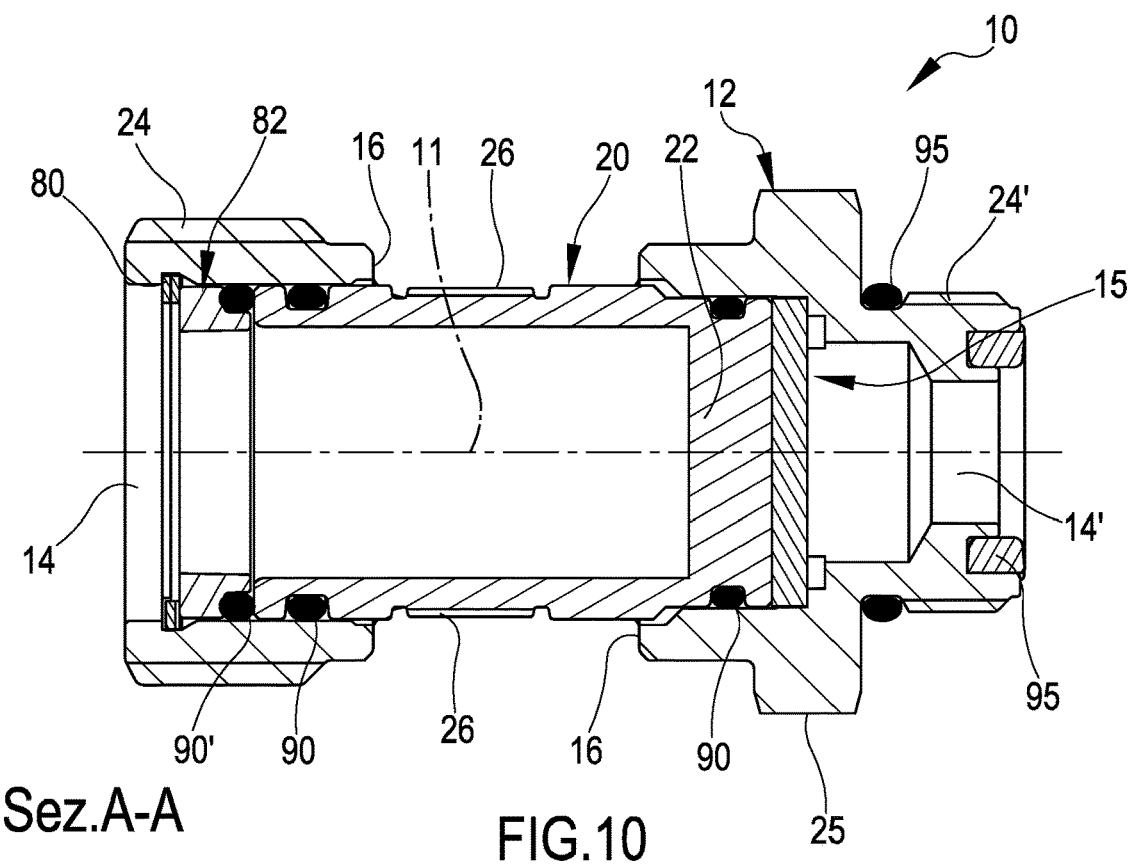
Sez.A-A  FIG.10

SEZ.B-B

SEZ.A-A

VALVE FOR HYDRAULIC CONTROL AND BALANCING OF FLUID FLOW RATE

RELATED APPLICATIONS

This application is a national phase application of and claims priority under 35 U.S.C. § 371 of PCT Patent Application Serial No. PCT/IB2020/051434 filed on Feb. 20, 2020 and titled VALVE FOR HYDRAULIC CONTROL AND BALANCING OF FLUID FLOW RATE. The content of this application is incorporated herein by reference.

FIELD OF THE INVENTION

The present invention relates to a valve for hydraulic control and balancing of fluid flow rate.

More particularly, the present invention refers to a new technical approach to a valve or hydraulic device for static control and dynamic balancing of the fluid flow rate in a conduit, particularly and in a non-limiting way, to the use in hydronic plants and thermotechnical plants for heating and cooling residential or industrial environments.

BACKGROUND OF THE INVENTION

Valves for hydraulic control and balancing of a fluid flow rate, known also as PICVs (Pressure Independent Control Valves) are typically used in hydraulic and thermotechnical applications in which the availability at the inlet of a constant flow rate of a liquid fluid, generally water, independently from the upstream and downstream fluid pressure variations, is required.

Said known types of valves for hydraulic control and balancing of the flow rate enable a more versatile and simplified design and implementation of hydronic plants in which it is required to keep constant the flow rate of a fluid thermal carrier to the inlets of one or more users, such as for example heat exchangers, radiators, fan convectors or similar, independently from the fluid pressure conditions present upstream towards the thermal source and downstream towards the user circuit or in branches or sections thereof, in order to meet the design thermal requirements of each single user and in order to prevent thermal or fluid dynamic unbalances, energy waste and the use of further control devices.

A conventional example of a flow rate control valve is implemented by a simple ball shutter valve provided with a through opening. The rotating ball aligns or misaligns the ball opening with the valve inlet and outlet ports consequently varying the fluid passage cross-section between a minimum and maximum values.

A further example of valves for dynamic control and balancing of the fluid flow rate is described in the European patent EP 3 201 500 (B1) in the name of the same Applicant and regarding a valve comprising means for static control of the fluid flow rate configured to vary the cross-section of a passage port between the valve inlet and outlet and flow rate dynamic balancing means configured to regulate the flow rate of a fluid exiting the valve as a function of a flow rate variation of an entering fluid. The dynamic balancing means comprise a perforated element interposed between the inlet port and an intermediate chamber in order to enable a fluid to flow only through at least one opening of the perforated element. Moreover, an elastic element is placed at a face of the perforated element facing the fluid inlet port in the valve body so that an increase of the pressure difference between the valve inlet and outlet is matched by an enlargement of the elastic element in order to shrink the passage area of the perforated element opening and to ensure a constant flow rate.

Present small and large plants of thermotechnical and hydronic, residential or industrial plants, can operate both for heating by piping to the user circuit plant a "hot" fluid thermal carrier and for cooling by piping to the same circuit of the user plant a "cold" fluid thermal carrier, said hot and cold fluid thermal carriers being both supplied by different thermal sources. Generally, the alternate delivery of a hot fluid thermal carrier and cold fluid thermal carrier in circuits of hydronic plants combined for heating and cooling, known also as "four pipes" circuits, is typically switched by conventional multiway valves, typically "six way" valves (three plus three ways), configured to pipe and control inside the same circuit the fluid delivery and return, alternatively, between a hot thermal source for heating or a cold thermal source for cooling, according to the requirements of a user.

Moreover, nowadays in many applications the circuits of some users or some sections of the same plants can be required to operate in a heating mode while other can be required to simultaneously operate in a cooling mode. Using a six-way hydraulic valve installed at the ends of each user or (delivery and return) circuit section of a plant enables to alternatively switch the same users or sections from the heating mode to the cooling mode and vice versa, independently from each other.

Some examples of multi-way diverter valves used in the state of the art are the known six ways valves obtained for example by combining two conventional three ways diverter valves generally used in the "four pipes" plants for managing a same area with two distinct thermal sources.

A typical example of multiway diverter valves is described in the Italian patent application IT 201700010534 in the name of the same Applicant and regarding a multiway valve comprising a valve body with a first and second diverter valves cooperating with each other and each provided with a first and second diverter members and with a triad of opening orifices in the valve body, wherein said multiway valve comprises a tubular cartridge integrating said first and second diverter member. The tubular cartridge is housed inside the valve body and can be displaced inside the valve body and is provided with command members for causing said displacement.

Other examples of these types of multiway diverter valves are described in the following prior art documents US 2011/0303863 (A1), CN 2402891 (Y) and CN 103133444 (A).

The above-mentioned cited known control-balancing valves, or PICVs, have however disadvantages and operating limitations, particularly when they are used in combined circuits and hydronic plants for heating and cooling, provided with diverter valves.

A serious drawback of these cited types of control/balancing valves, particularly in combined heating-cooling hydronic plants, is due to the size thereof and to the lack of room available for mounting them, and due to the fact that in both the delivery-return connecting manifolds of the user and the diverter valve connecting manifolds, there is a great number of hydraulic connecting conduits and pipes which must be often arranged and placed in small and narrow spaces, such as cassettes or junction boxes. Particularly, in plants made and configured to already existing buildings and houses, rooms are further cramped or unavailable.

A further typical limit and drawback of conventional combined heating-cooling hydronic plants provided with diverter multi-way valves is due on that nominal flow rates of the fluid thermal carrier required by the user in heating mode are generally different from flow rates in cooling mode, consequently it is required to use flow rate control means or valves configured to change the amount of the fluid thermal carrier flow entering the diverter valve, depending on whether flow comes from a hot or a cold source.

Therefore, it is extremely difficult for an operator to have enough rooms in which easily install said conventional valves for hydraulic control and balancing of the flow rate and for connecting them to conduits and delivery manifolds at the inlet of the diverter valve from different thermal sources.

Moreover, it is also difficult or even impossible to ensure the further handling room or convenience required to actuate the control/balancing valve itself, both if it's of a manual type by means of a lever, knob, wheel or tap, or it's of an automatic type by means of electric or electromechanical actuators or servomechanisms; therefore, even though it were possible to physically install a valve, the required room for manual handling or housing of remotely controlled electromechanical actuators or servomechanisms, will be still cramped or uncomfortable.

Still, a further limit of the conventional control balancing valves, is due to the fact that said handling room or convenience and space for housing an actuator or servomechanism increase proportionally to the fluid passage cross-section of the valve itself. Indeed, as the valve size increases also the lever or hand command element configured to apply the torque required to move the shutter increases, otherwise the size and dimension of the analogous mechanical or electromechanical servomechanism have to be increased in order to generate the torque required to maneuver the shutter itself.

Moreover, a further drawback of small-sized and geometrically simple dynamic balancing valves which are not provided with membranes or other types of means configured to measure inlet and outlet pressure, is due to the fact that they regulate the fluid flow rate generally only as a function of the inlet momentum applied to regulating members instead of control the flow rate also as a function of the fluid pressure difference between the valve inlet and outlet ports.

A still further limit of the conventional control balancing valves is due to their low ratio of the fluid passage cross-section to the outer size of the valve, and due to the fact that the presence of inner members, their size and sudden changes of direction they impose to the fluid, limits the outlet maximum flow rate so that an user is forced to choose larger valves.

The required provision of different control of the nominal flow rate of a fluid thermal carrier supplied from different sources to the diverter valve, an essential feature for securing the planned thermal exchange inside the user circuit, is typically met, in the presence of narrow rooms, by using of calibrated washers provided on pipe connecting manifolds, on the delivery openings orifices of the diverter valves. Said washers are provided with a calibrated sized central hole in order to generate a concentrated head loss of the flow which, under designed nominal pressure conditions, ensures the required nominal fluid flow rate.

This conventional technical approach, despite being suitable in installation narrow rooms and volumes, has also limits and drawbacks because nor it makes possible further regulating due, for example, to changed conditions of a user plant after modifications or expansion, neither enables an operator to visually check the calibrated diameter of a beforehand installed washer.

Indeed, in up-to-date engineering type implementations, it is sought the capability of a plant to be easily adaptable and modifiable as a function of changed needs of a user, for example caused by future extensions or modifications, which is not possible in the above cited examples except for disconnecting, disassembling or opening the manifolds, connecting conduits between the ports of the diverter valve for replacing or recalibrating of control means, such as calibrated washers, such operation, besides being disadvantageous and uncomfortable, entails costs and the requirement of a skilled technical operator.

SUMMARY OF THE INVENTION

An object of the present invention consists of overcoming, at least partially, the operative drawbacks and limits of the above discussed prior art. More specifically, object of the present invention consists of providing to an operator a valve for hydraulic control and balancing of fluid flow rate capable of being installed in extremely narrow rooms, typically cabinets or general manifold boxes provided with a high number of interconnected pipes or conduits.

A further object of the invention consists of providing a valve for hydraulic control and balancing of fluid flow rate which can be easily arranged, adjustable, and maneuverable by an operator in extremely narrow rooms typical of cabinets and manifold general boxes containing a high number of interconnecting pipes or conduits, without using levers, taps, wheels or other handling servomechanisms outside the body of the valve itself.

A further object of the invention consists of providing a valve for hydraulic control and balancing of fluid flow rate, capable of being easily arranged and adaptably paired with a multiway diverter valve or capable of being associated to already existent plants.

Last but not least object of the present invention is to provide a small-sized valve, a multiway diverter valve assembly or a six-way valve simultaneously allowing hydraulic independent control and/or balancing of fluid flow rate at inlet or outlet ports.

A still further object of the present invention consists of providing an operator a valve for dynamically balancing a flow rate capable to control a fluid flow rate as a function of the momentum of the entering fluid and also as a function of the pressure difference between the valve inlet port and outlet port.

A still further object of the present invention consists of providing to an operator a valve for control and balancing of fluid flow rate having a greater ratio between the fluid passage cross-section and therefore the flow rate and the external size of the valve.

Lastly, a further object of the present invention consists of providing a valve for hydraulic control and balancing of fluid flow rate capable of ensuring a high level of strength and reliability in the long term, and such to be easily and economically manufacturable.

These and other objects are met by the valve for hydraulic control and balancing of fluid flow rate object of the present invention according to the independent claim.

The structural and functional characteristics of the valve for hydraulic control and balancing of fluid flow rate can be better understood from the following detailed description in which it is made reference to the attached drawings representing some preferred non-limiting embodiments, wherein:

BRIEF DESCRIPTION OF THE DRAWINGS

FIGS. 9 and 10 are schematic illustrations respectively of a longitudinal cross-section view along the plane B-B in FIG. 7 and of a longitudinal cross-section view along the plane A-A of FIG. 9 of the first embodiment of the valve for hydraulic control and balancing of fluid flow rate object of the present invention;

DETAILED DESCRIPTION OF THE INVENTION

Figure 1:
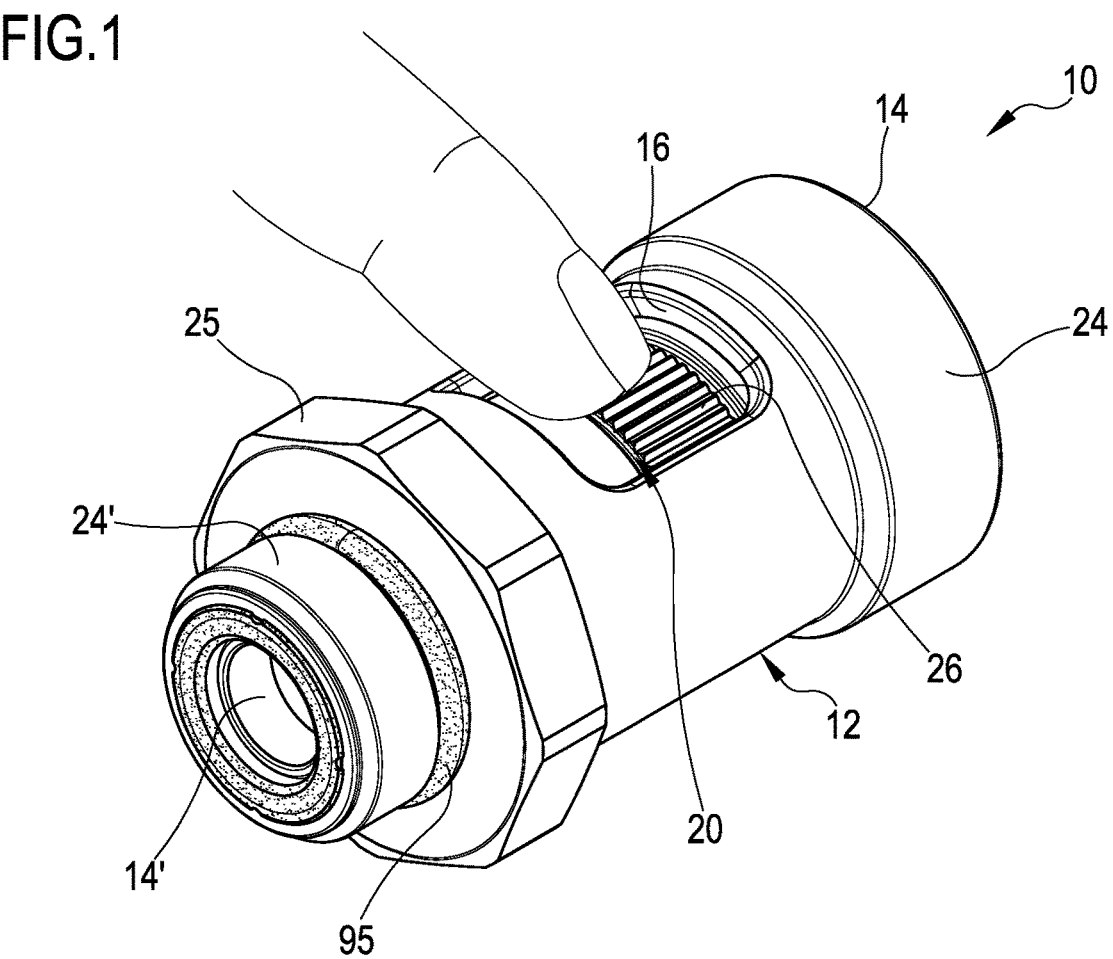
FIG. 1 is a schematic illustration of an axonometric view of a first simplified embodiment of the valve for hydraulic control and balancing of fluid flow rate object of the present invention, clearly showing the manual regulating control step performed by an operator acting on the outer surface of the shutter through an opening made in the valve body.
Figure 2:
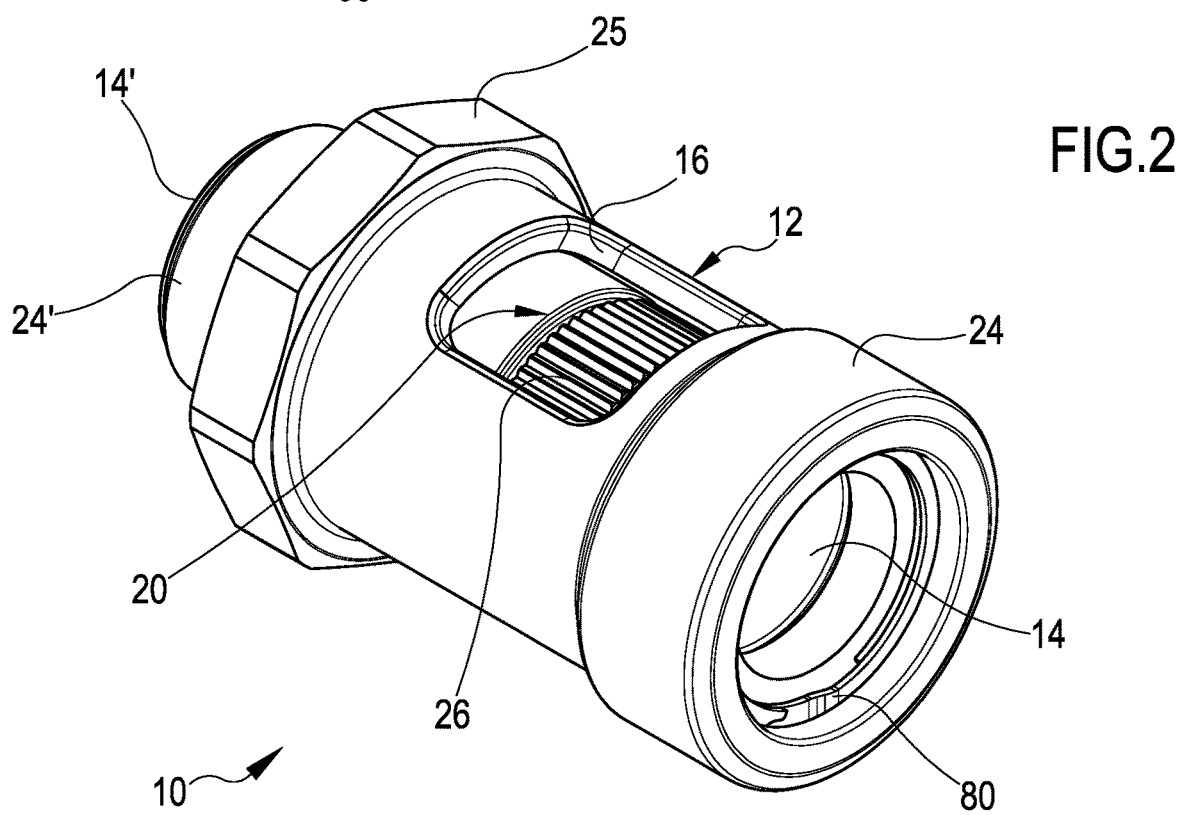
FIG. 2 is a schematic illustration of a further axonometric view, from a different point of view, of a first embodiment of the valve for hydraulic control and balancing of fluid flow rate object of the present invention.

With preliminary reference to Figures from 1 to 3, and particularly to Figures from 7 to 10, which show a first simplified embodiment of the valve for hydraulic control and balancing of fluid flow rate object of the present invention, indicated by 10, and only suitable to statically control or pre-regulate fluid flow rate.

Moreover, it is made reference to Figures from 4 to 6 and from 11 to 14, which show a second embodiment of the valve for hydraulic control and balancing of fluid flow rate object of the present invention, generally indicated by 10' and both configured to statically control or pre-regulate and dynamically balance a fluid flow rate. Said valves 10, 10' comprise:

a body 12 generally having a substantially tubular cylindrical shape provided with an inlet opening 14, outlet opening 14' disposed at the ends of said body 12 and having at least one actuating opening 16 radially formed on the body 12 itself;

a hollow rotating shutter 20 rotatively housed inside said body 12, with respect to a rotation axis 11, said rotating shutter 20 being configured to be crossed by a fluid and to rotatively change the passage cross-section of a fluid inside the body 12 itself of the valve 10, 10'.

Referring in particular to FIGS. 9 and 10 and 13 and 14, the valve 10, 10' comprises the novel characteristics of a rotating shutter 20 having a glass or cup shape comprising at least one first opening 22', developing along the rotation axis 11 of said rotating shutter 20 and eccentric to the same rotation axis 11, said first opening 22' cooperatively rotating with at least one mated second opening 15', eccentric to the same rotation axis 11 of the rotating shutter 20, said second opening 15' being formed on an inner wall 15 of said body 12, so that a rotation of said first opening 22' with respect to said second opening 15' is matched by a variation of the fluid passage cross-section. Said rotating shutter 20 is configured to be further directly manually rotatively actuated, inside said body 12, by the exposed diametral surface thereof, through said actuating opening 16, so that a rotation of said first opening 22' with respect to said second opening 15' is matched by a variation of the fluid passage cross-section in a direction substantially coinciding with the rotation axis 11 of the same rotating shutter 20.

Still referring to the preferred embodiment in the figures, the body 12 can advantageously comprise two actuating openings 16 radially and diametrally formed oppositely to each other, so that it is possible to easily gain access to diametrally opposite portions of the outer diametral surface of the rotating shutter 20 from the outside of the body 12 so that an operator will be capable of gripping the rotating shutter 20 by his/her two opposite fingers.

The first opening 22' is through and can be shaped in a different way and is formed on a bottom wall 22 of said rotating shutter 20, said shutter rotatively facing to seatback against said inner wall 15 of the body 12.

The second mated opening 15' is also through and can be differently shaped, preferably coinciding with a first opening 22. The number of said first and second openings 22' and 15' can be more than one, as in the embodiments shown in FIGS. 3 and 6 and they enable by rotating the first with respect to the second, by to the rotation of the rotating shutter 20, to alternatively increase or decrease the fluid passage cross-section.

Said inner wall 15 can be made and formed directly in the body 12 or can be advantageously defined by a perforated disk-shaped element removably housed inside the body 12. Said inner wall 15 can be further provided with at least one lobed portion 17 mated to a corresponding mated recess formed inside the body 12, said lobed portion 17 being such to prevent the same inner wall 15 from rotating and to hold the second opening 15' in a stationary position with respect to the first rotatively mated opening 22' of the rotating shutter 20.

Said body 12 and said rotating shutter 20 are preferably made of a metal material, typically, copper alloys or iron alloys, however, can be also advantageously made of plastic polymeric materials and thermoplastic materials, or of materials obtained by sintering metal or ceramic powders or of materials obtained by additive manufacturing processes.

The body 12 can be also preferably provided, at its ends, with known connecting means 24, 24' configured to connect the valve 10 to conventional elements for connecting pipes and conduits, such as for example threads, connectors, fittings or equivalent, both of a male and female types.

Advantageously, one or more clamping profiles 25, such as collars or hex key profiles configured to be mated with conventional assembling hex keys and tools, can be also further made on the outer surface of the body 12.

The rotating shutter 20 can be advantageously provided with an irregular surface portion 26 formed on an annular portion of the outer surface itself and exposed through the actuating opening 16 of the body 12, for example obtained by knurling the metal surface and configured to easily enable an operator to manually actuate it.

Figure 8:
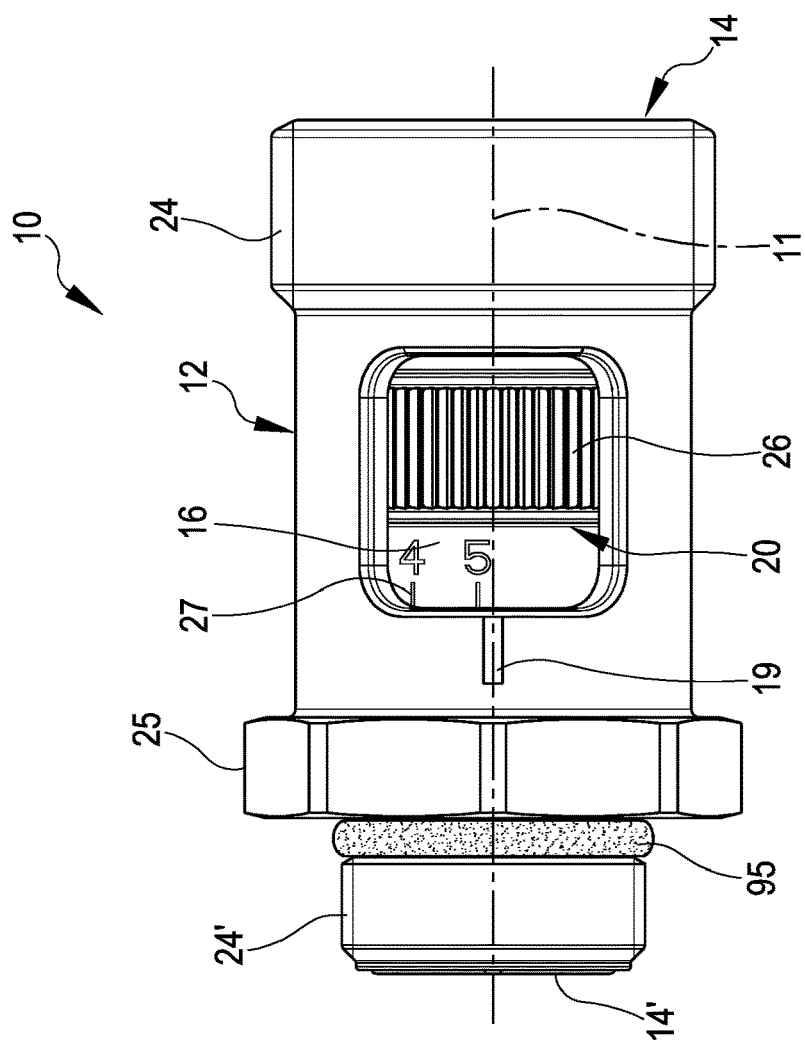
FIGS. 7 and 8 are schematic illustrations respectively of a front view and lateral view of the first embodiment of the valve for hydraulic control and balancing of fluid flow rate object of the present invention.
Figure 7:
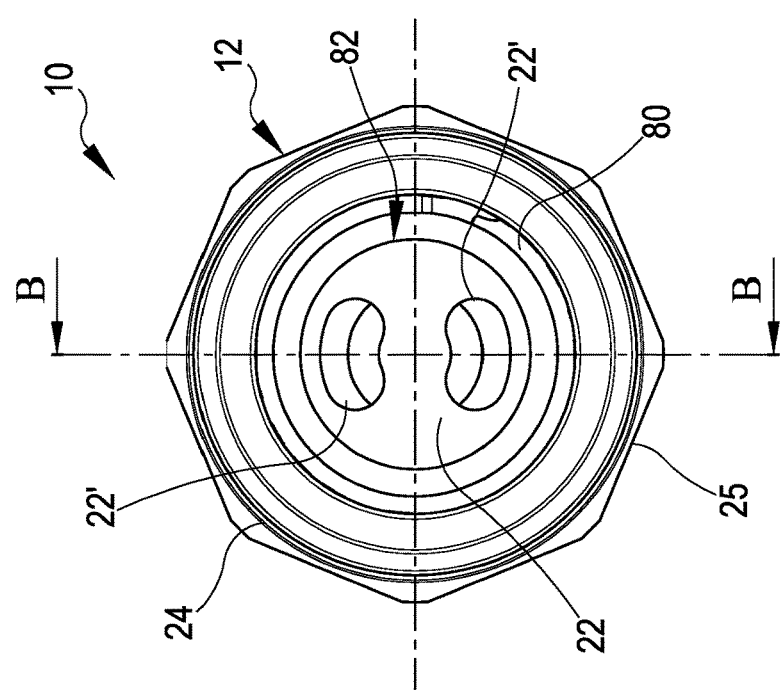
Figure 12:
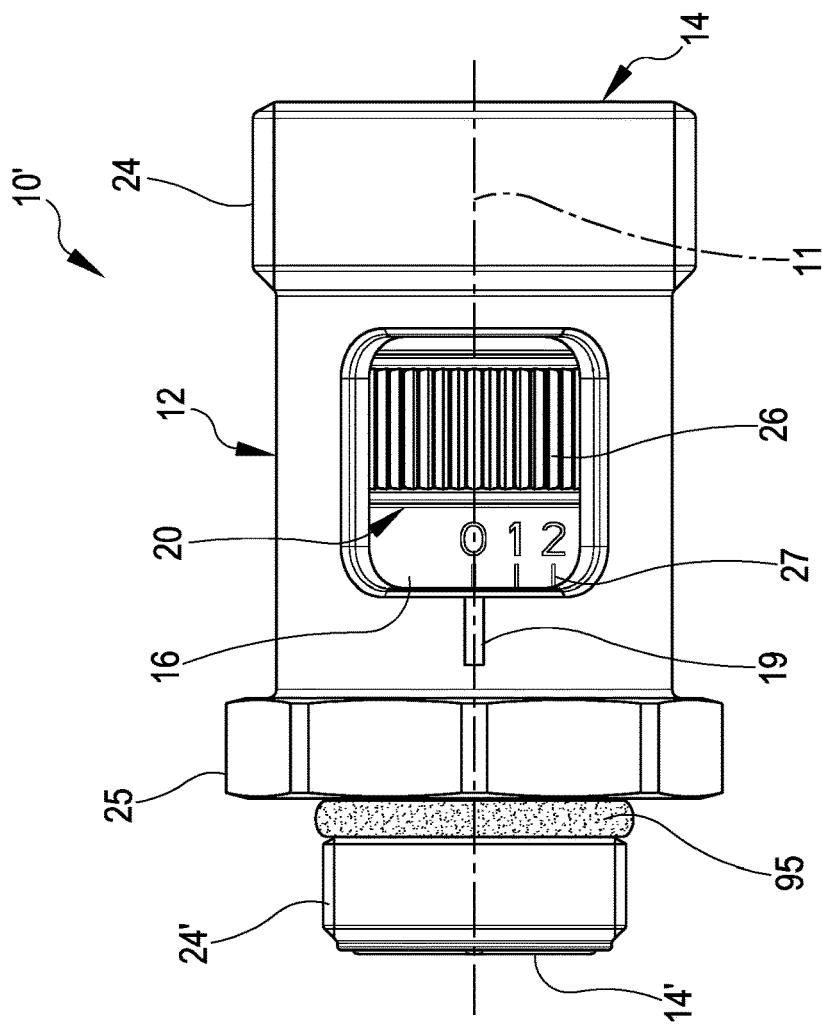
FIGS. 11 and 12 are schematic illustrations respectively of a front view and lateral view of the second embodiment of the valve for hydraulic control and balancing of fluid flow rate object of the present invention.
Figure 11:
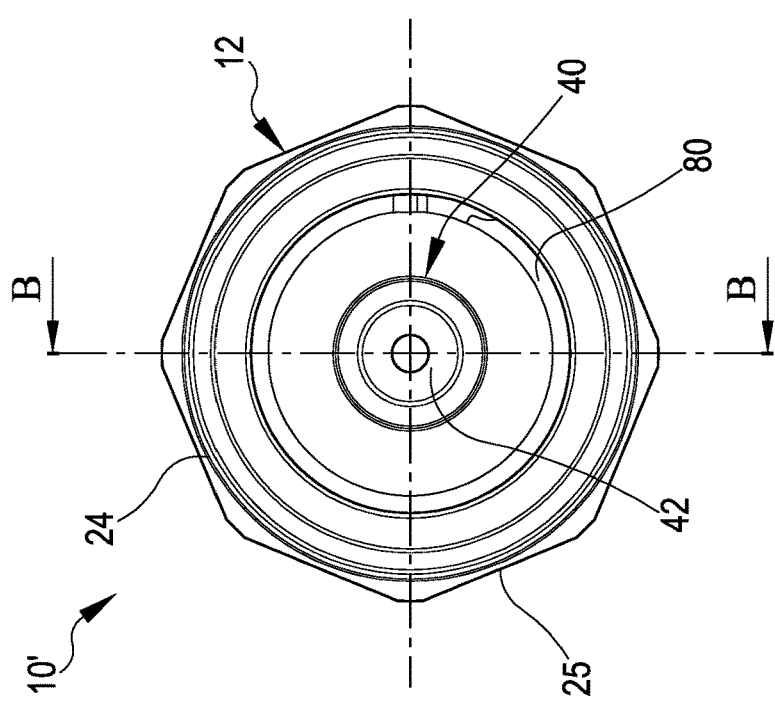

Referring particularly only to FIGS. 8 and 12, advantageously said rotating shutter 20 can be also provided with a graduated scale 27 formed again on an exposed annular portion of the outer surface thereof at the actuating opening 16 of the body 12, said graduated scale 27 being obtained by silk screen printing or stamping the metal surface and being configured, cooperatively with a nick or reference 19 formed on the body 12, to indicate to the operator, outside the body 12, the angular position of the second opening 22' of the rotating shutter 20 with respect to the stationary second opening 15' of the inner wall 15 and corresponding to a greater or smaller extension of the fluid passage opening.

Figure 3:
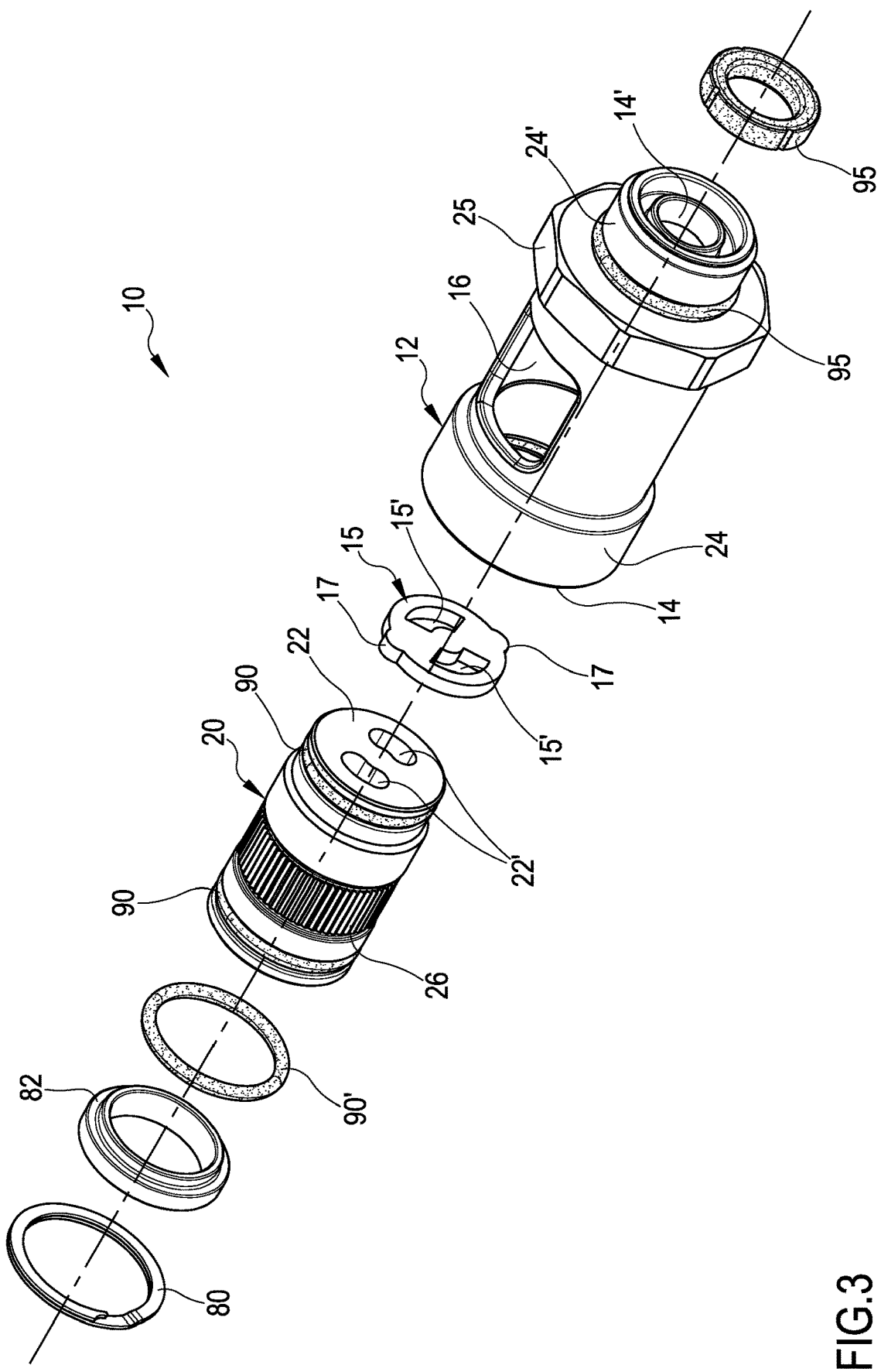
FIG. 3 is a schematic illustration of an exploded axonometric view of the first embodiment of the valve for hydraulic control and balancing of fluid flow rate object of the present invention.
Figure 4:
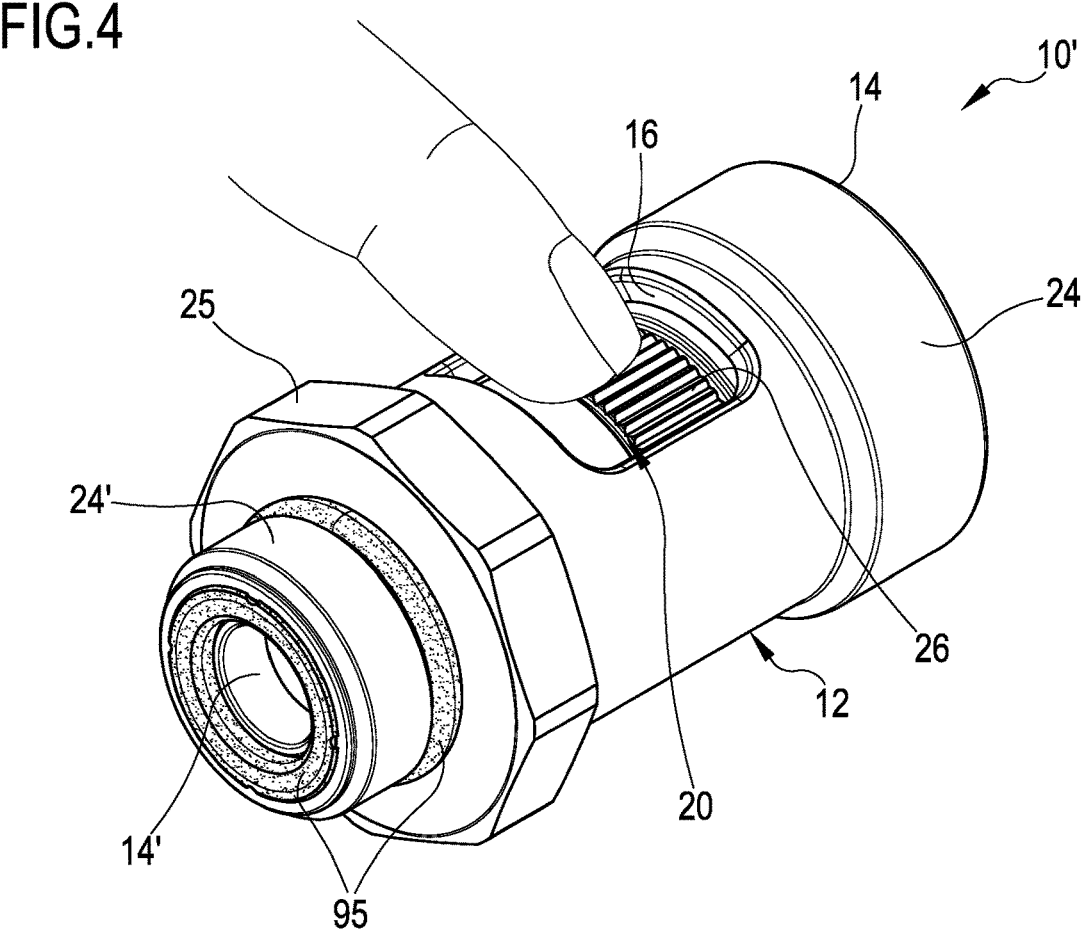
FIG. 4 is a schematic representation of an axonometric view of a second embodiment of the valve for hydraulic control and balancing of fluid flow rate object of the present invention, clearly showing the manual regulating control step performed by an operator acting on the external surface of the shutter through an opening made on the valve body.
Figure 5:
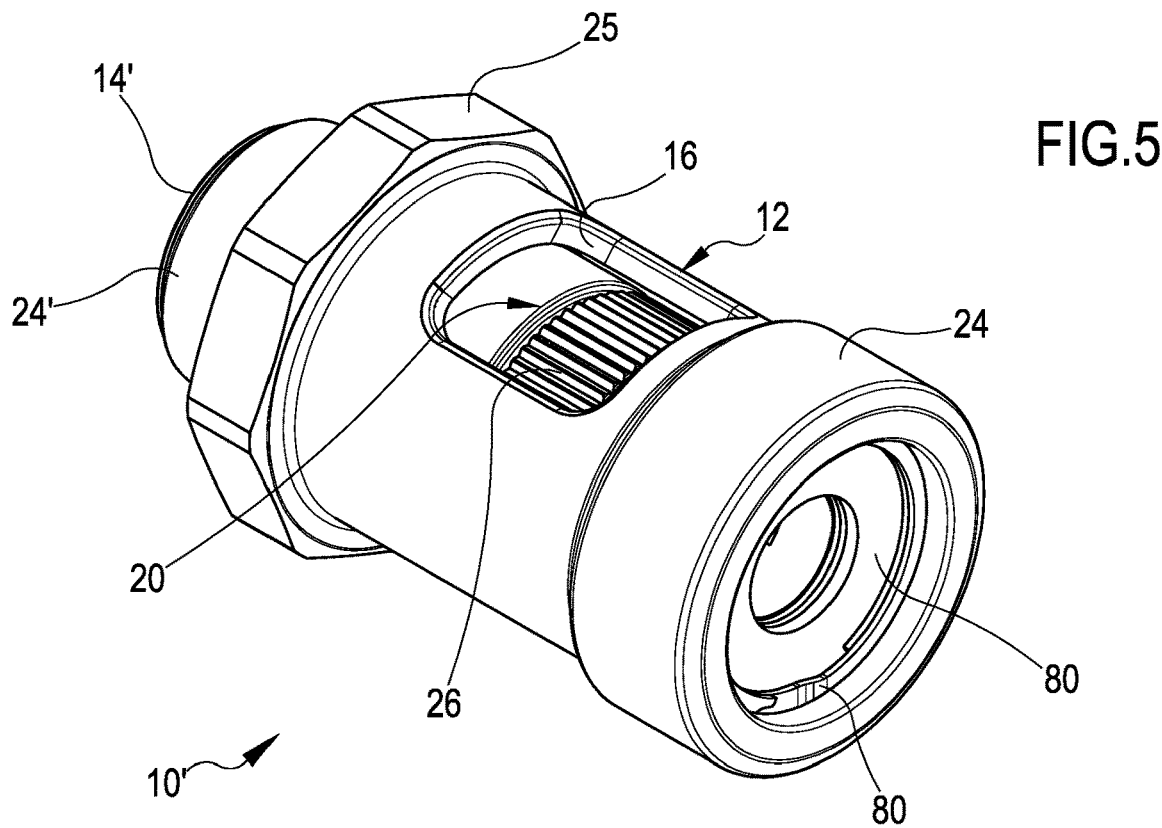
FIG. 5 is a schematic illustration of a further axonometric view, from a different point of view, of a second embodiment of the valve for hydraulic control and balancing of fluid flow rate object of the present invention.

Referring to FIGS. 3, 9, and 10, in the first embodiment, the valve 10 comprises a spacer 82 housed in said body 12 having substantially an annular shape, said spacer 82 being configured to close the opening 14 in order to prevent the inner elements to be extracted from the body 12 of the valve 10.

Valve 10, 10' can also comprise conventional first fluid sealing elements 90 disposed between the body 12 and rotating shutter 20 and second fluid sealing elements 90' disposed between said rotating shutter 20 and said spacer 82. Said first and second sealing elements 90, 90' can be further fit and housed in mated seats or recesses formed on the same rotating shutter 20 and spacer 82 or, alternatively, formed on the body 12 inner surface.

Valve 10, 10' can comprise also conventional third fluid sealing elements 95 disposed between the body 12 and other connecting elements, hydraulic devices or valves, not shown, said third fluid sealing elements 95 being generally fit and housed in suitable seats or recesses.

Figure 6:
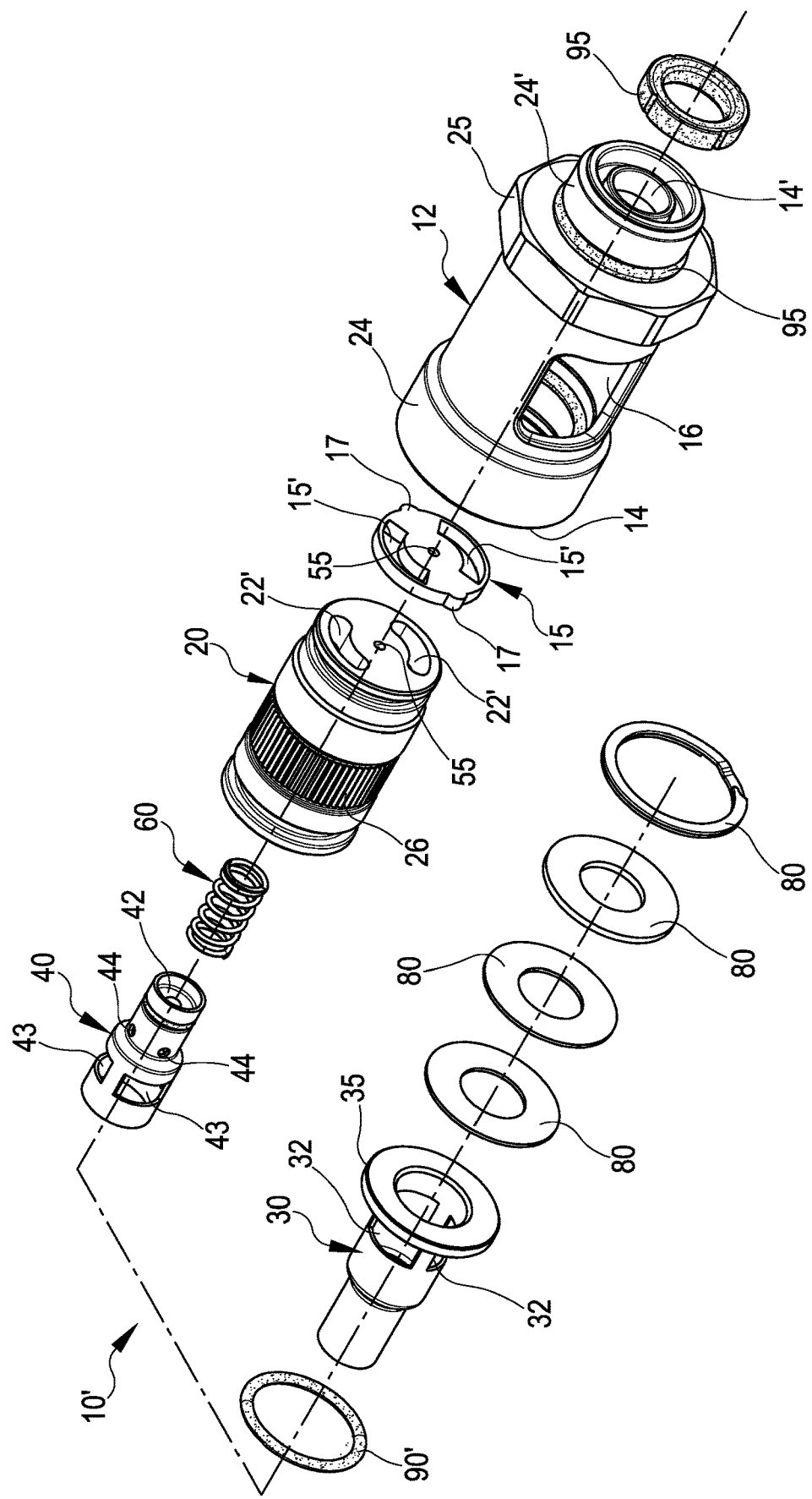
FIG. 6 is a schematic illustration of an exploded axonometric view of the second embodiment of the valve for hydraulic control and balancing of fluid flow rate object of the present invention.
Figure 13:
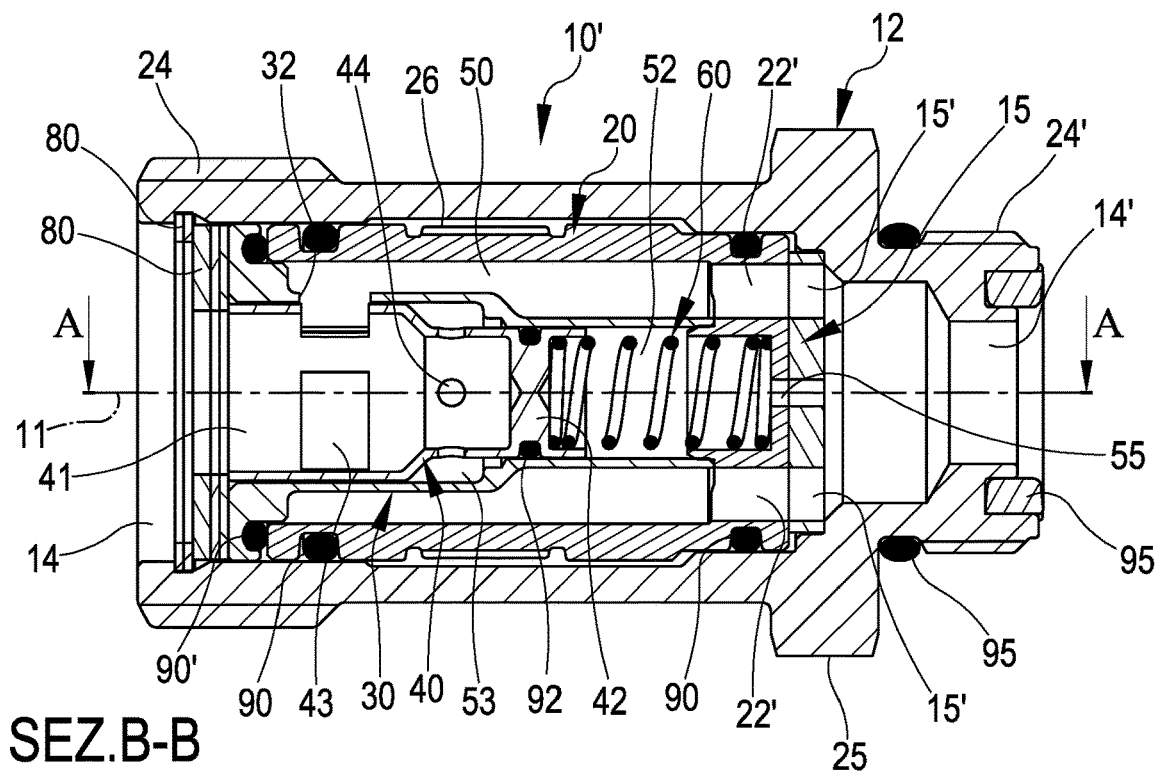
FIGS. 13 and 14 are schematic illustrations respectively of a longitudinal cross-section view along the plane B-B of FIG. 11 and a longitudinal cross-section view along the plane A-A of FIG. 13 of the second embodiment of the valve for hydraulic control and balancing of fluid flow rate object of the present invention.
Figure 14:
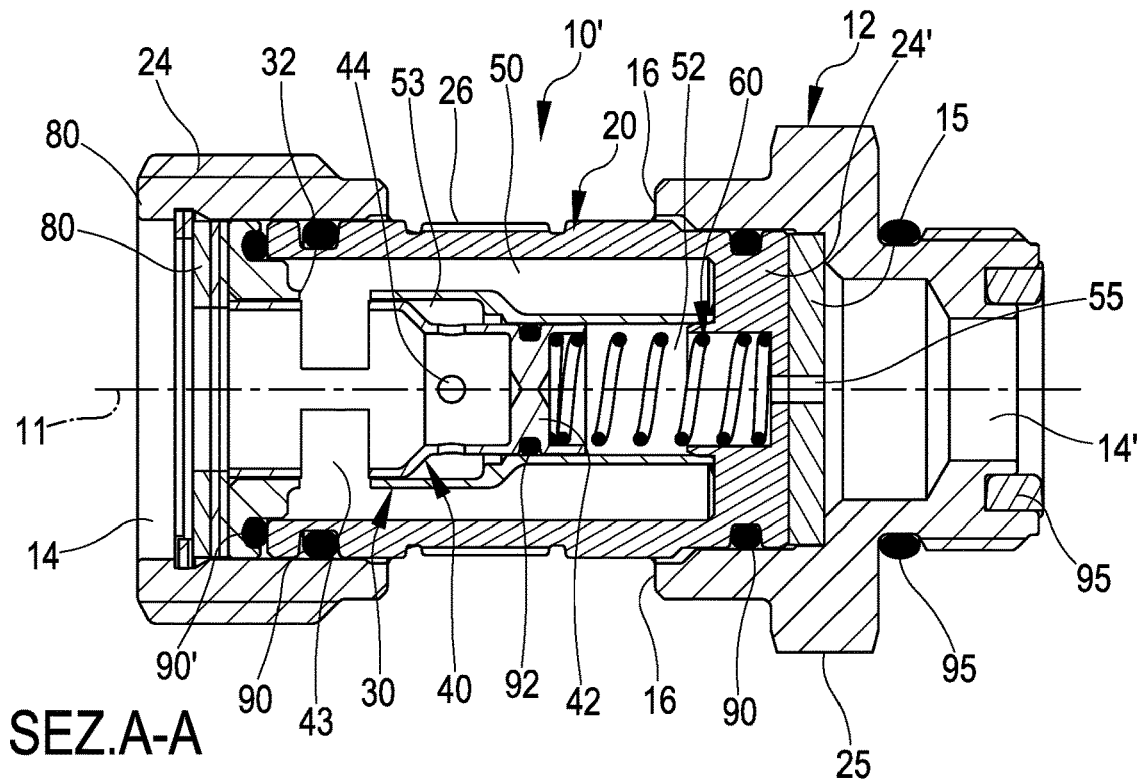

Referring now to Figures from 4 to 6 and from 11 to 14, and particularly to FIGS. 6, 13 and 14, in a second embodiment, the valve 10' further comprises:

a sleeve 30 having a substantially tubular shape, housed inside the rotating shutter 20 and defining with it a substantially toroidal annular chamber 50, said sleeve 30 being provided with at least one first through radial opening 32 formed in the lateral wall of the sleeve itself 30 and being disposed, at an end thereof, in contact with the bottom wall 22 of said rotating shutter 20 and with the opposite end facing the inlet opening 14;

a floating piston or shutter 40, slidingly housed inside the sleeve 30, having a substantially tubular glass or cup shape, with a bottom 42 and provided with at least one second radial through opening 43 made on the lateral wall, cooperating and mated to said first radial opening 32, said floating shutter 40 defining a first inner chamber 41 and a second inner chamber 52 comprised and delimited between the bottom 42 of the floating shutter 40 itself, the sleeve 30 and the bottom wall 42 of the rotating shutter 20;

so that an axial translation motion of said second radial opening 43 of the floating shutter 40 with respect to said first radial opening 32 of the sleeve 30, is matched by a variation of the fluid passage cross-section proportional to the axial sliding of the floating shutter 40.

Said fluid passage cross-section, defined between said first and second radial openings 32, 43, is configured to fluidically connect said annular chamber 50 to the inlet opening 14 of the valve 10', through the first chamber 41. In contrast, said second inner chamber 52 is fluidically connected to the outlet opening 14' by at least one passage 55 made through the bottom wall 22 of the rotating shutter 20 and inner wall 15, so that a force determined by a pressure difference between the inlet opening 14 and outlet opening 14' acts on the bottom 42 of the floating shutter 40.

Preferably, said passage 55 is coaxially made with the rotation axis 11, so that it does not change the passage cross-section thereof or is not obstructed by the rotation motion of the rotating shutter 20 with respect to the inner wall 15.

With reference to the preferred embodiment of valve 10' of the figures, a plurality of said first and second radial openings 32, 43 are diametrally made and distributed on the lateral walls of said sleeve 30 and said floating shutter 40, so that the relative rotation between sleeve 30 and floating shutter 40 with respect to the rotation axis 11 determines a negligible variation of the fluid passage cross-section with respect to the axial sliding motion of the floating shutter 40.

Valve 10' can be also provided with an elastic return element 60 disposed inside the second inner chamber 52 between the bottom 42 of the floating shutter 40 and the bottom wall 22 of the rotating shutter 20, and configured to hold the floating shutter 40 itself in a monostable position with the first radial opening 32 and second radial opening 43, in a position corresponding to the maximum fluid flow passage.

Valve 10' can be also provided with an elastic return element 60 disposed inside the second inner chamber 52 between the bottom 42 of the floating shutter 40 and the bottom wall 22 of the rotating shutter 20, and configured to hold the floating shutter 40 itself in a monostable position with the first radial opening 32 and second radial opening 43, in a position corresponding to the maximum fluid flow passage.

Advantageously, the elastic element 60 can be also housed, at the ends thereof, inside a first recess 21' formed on the bottom wall 22 of the rotating shutter 20 and inside a second recess 42' made at the bottom end 42 of the floating shutter 40, in order to be firmly held in position with respect to the sleeve 30 and the floating shutter 40 itself.

Specifically, it is made reference to the preferred embodiment of FIGS. 9 and 13, in which the sleeve 30 and floating shutter 40 can be advantageously formed in a "goblet" shape having a diametral increased cross-section at the corresponding ends facing the inlet opening 14, in order to enable a greater structural size of the first and second mated radial openings 32, 43 and first and second mated openings 22', 15', with respect to a structural size obtainable by a simpler cylindrical tubular shape.

The goblet shape of the sleeve 30 and floating shutter 40 defines between them a further third chamber 53 having a volume varying with the axial sliding of the floating shutter. Said third chamber can also act as an elastic element upon compressing the air trapped inside the chamber.

One or more drain holes 44 for draining a possible incompressible liquid being trapped between the walls of said third chamber 53 can be provided, and such to prevent the floating shutter 40 from freely sliding inside the sleeve 30.

Referring again to the preferred embodiment of the figures, said sleeve 30 can comprise a diametral increased portion 35 with a shoulder formed at the open end thereof facing the inlet opening 14, said diametral increased portion 35 being configured to enable the sleeve 30 to be stably housed inside the body 12. In a further alternative embodiment, the diametral increased portion 35 can be separated from and be in contact with the sleeve 30 or can be replaced, for example, by the spacer 82 of the first simplified embodiment of the valve 10.

Referring in particular also to FIGS. 13 and 14, the valve 10' can comprise one or more conventional first fluid sealing elements 90 disposed between the body 12 and rotating shutter 20 and one or more fluid sealing elements 90' disposed between said rotating shutter 20 and said sleeve 30. Said first and second sealing elements 90, 90' can be fit and housed in mated seats or recesses formed on the rotating shutter 20 and diametral increased portion 35 of the sleeve 30 or alternatively formed on the inner surface of the body 12.

Sleeve 30 and floating shutter 40 can be also preferably made of a metal material, typically copper alloys or iron alloys, however they can also be advantageously made of plastic polymeric materials or thermoplastic materials or materials obtained by sinterizing metal or ceramic powders or of materials obtained by additive manufacturing process. Referring again to all the Figures from 1 to 14, said valve 10, 10' can be advantageously provided with conventional stop elements 80, such as for example elastic retaining rings, snap rings also known as Seeger, washers and similar, housed in an annular recess formed on the inlet opening 14 of the body 12, said stop elements 80 being configured to prevent said spacer 82 and/or shutter 30 from axially sliding and being extracted.

Referring now just to FIGS. 6, 13 and 14, in the second embodiment, the valve 10' can further comprise at least one third fluid sealing element 92, such as for example gaskets or O-rings, disposed between the sleeve 30 and floating shutter 40 and configured to maintain the fluid sealing between said first inner chamber 41 and said second inner chamber 52. Advantageously, said third sealing element 92 can be also fit and housed in a seat or recess 45 formed on the outer diametral surface of the floating shutter 40.

Said first and second sealing elements 90, and 90' and said other sealing elements 95 can be of the gasket type or O-ring type, preferably made of polymeric and elastomeric materials.

Figure 15:
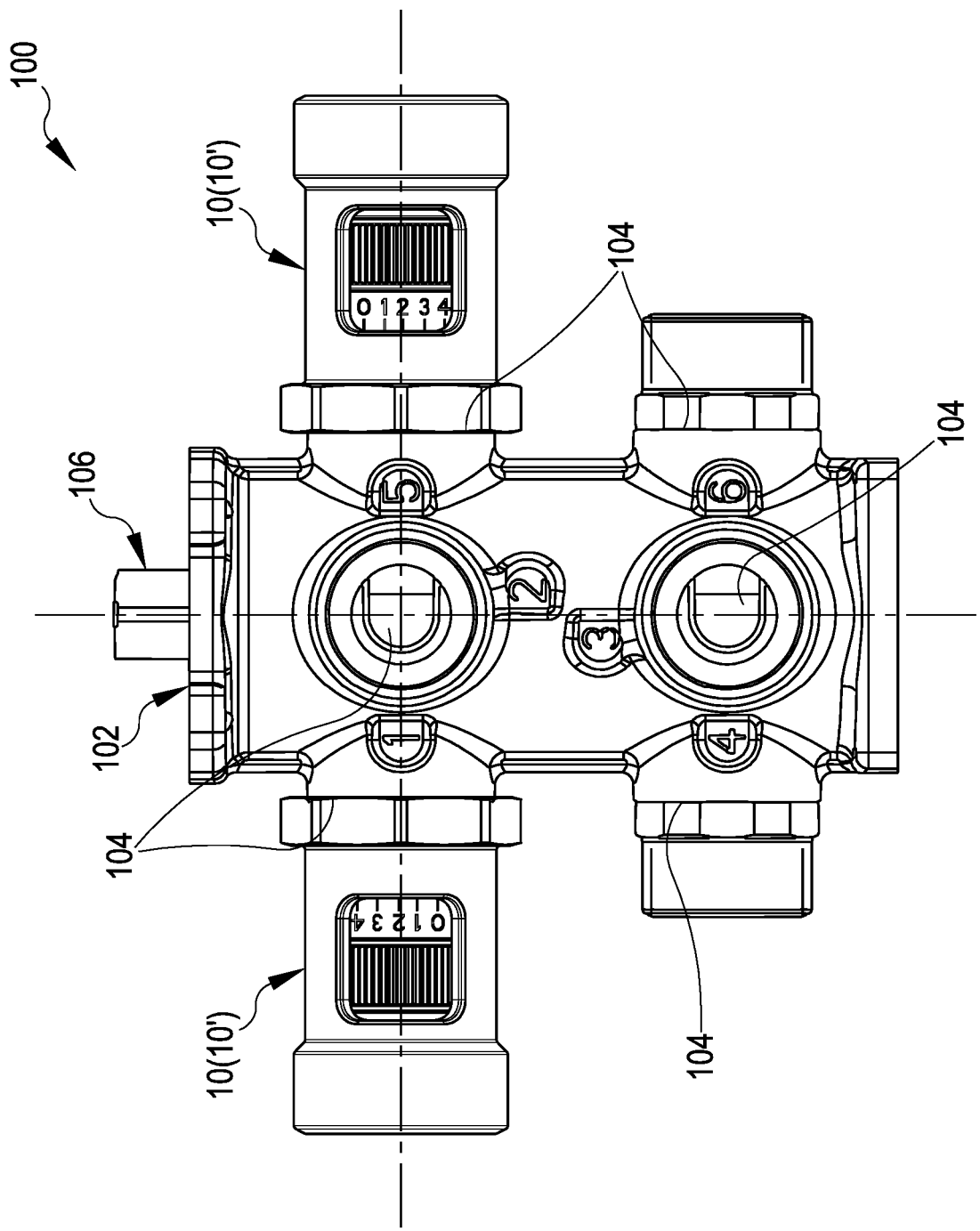
FIG. 15 is a schematic illustration of a front view of a known multiway hydraulic diverter valve provided with two valves for hydraulic control and balancing of fluid flow rate object of the present invention, disposed on the inlet openings from thermal sources.

Referring just to FIG. 15, part of the object of the present invention is also a device comprising a valve 10, 10' attached to a conventional multiway hydraulic valve or diverter valve 100, such as for example a six way (3+3) valve, provided with a valve body 102 and a plurality of openings 104 formed on the valve body 102 itself and actuating inner members 106 capable of selectively piping the flow rate of the fluid entering the inlet openings from two distinct thermal sources to a single outlet opening towards the thermal user circuit and returning from the return opening from the user circuit selectively towards the two outlet openings returning to the sources.

The multiway valve or diverter valve 100 comprises at least one valve 10, 10' for hydraulic control and balancing of fluid flow rate stabilized at one of the openings of the multiway valve or diverter valve 100 itself, preferably, but in a non-limiting way, at the openings 104 connected by the thermal sources, for example hot and cold, to the multiway valve or diverter valve 100.

From the description of the valve 10, 10' for hydraulic control and balancing of fluid flow rate object of the present invention, it is understood the operation described in the following.

Referring to Figures from 1 to 3 and from 7 to 10, in the first simplified embodiment, the valve 10 is capable of providing only one static control or pre-regulation of the fluid flow rate. The static control of the fluid flow rate is the same also in the second embodiment of the valve 10', in the same way to what is hereinbefore described with reference to the first embodiment of the valve 10.

In the valve 10, 10' of the present invention, the rotating shutter 20, for example unlike a conventional hollow ball shutter, is configured to rotate and to be crossed by a fluid with respect to an axis substantially coinciding with the fluid flow direction, between the inlet opening 14 and outlet opening 14', without the requirement of using levers, knobs, taps, or wheels, and when the outer diametral surface of the shutter itself operates as an actuating means.

The operator, by acting with one or more fingers on the irregular surface portion 26 through the actuating opening 16 of the body 12, puts in rotation the rotating shutter 20 with respect to the body 12 itself of the valve 10, 10'. A rotation of the rotating shutter 20 aligns the first openings 22' so that they are cooperatively oriented with the mated second openings 15' of the inner wall 15, in order to consequently vary the port or fluid flow cross-section passage inside the valve 10, 10' between a minimum or null value and a maximum value respectively corresponding to the obtainable maximum and minimum limit values of the flow rate.

The valve 10, 10' can be configured to interrupt the fluid flow in a position wherein the first openings 22' and second openings 15' do not overlap, not even partially, or the valve 10, 10' can be configured in order to always ensure a minimum fluid flow passage by always leaving a minimum overlapping surface between the first and second openings 22', 15' themselves. When the shapes of the first opening 22' of the rotating shutter 20 coincide with each other, by overlapping the shapes of the second openings 15' of the inner wall 15, the maximum opening of the fluid flow passage is obtained. The greater the offset angle between the first openings 22' and second openings 15' is, the smaller the fluid flow passage opening will be. The graduated scale 27, present on the external surface of the rotating shutter 20, shows the operator the offset angle of the openings 22' and 15'; when the offset angle is about 0°, in other words the openings completely overlap on each other, the maximum value of the graduated scale is positioned at the nick or reference 19. Vice versa, when the maximum offset angle between the first openings 22' and second openings 15' is the greatest and corresponds to a minimum or null passage port of the fluid, the minimum value of the graduated scale is in correspondence of the nick or reference 19.

Once the opening of the passage port or cross-section is adjusted by rotating the rotating shutter 20 in order to take the numeric value selected on the graduated scale 27 to the nick or reference 19 corresponding to the desired nominal flow rate, the flow rate exiting the valve 10, 10' therefore remains constant if there are not upstream and downstream pressure variations.

With reference to Figures from 4 to 6 and from 11 to 14, the valve 10' of the second embodiment is capable of providing, besides a static control or pre-regulation, also a flow rate dynamic balancing, in other words the valve 10' is capable of self-balancing and maintaining constant the fluid flow rate set by the graduated scale 27 by rotating the rotating shutter 20, also as a result of a variation of the upstream and downstream fluid pressure conditions.

In an initial transient phase, the pressurized fluid flow enters the valve 10' through the inlet opening 14 and flows in proximity of the first inner chamber 41 of the floating shutter 40, striking the floating shutter 40 itself floods the annular chamber 50 by flowing through the passage cross-section defined by the first radial openings 32 of the sleeve 30 and by the second radial openings 43 of the floating shutter 40, said openings being completely overlapped.

Referring particularly to FIGS. 13 and 14, the increasing momentum of the entering liquid flow rate causes an increased pressure in the first inner chamber 41 and such to produce a force, proportional to its strength, on the bottom 42 of the floating shutter causing it to axially translate and overcoming the force of the elastic element 60. The increasing flow rate through the first and second radial openings 32, 43, determined by a pressure increase in the first inner chamber 41, increases also the thrusting force on the floating shutter 40 which is consequently caused leaded to translate towards the outlet opening 14' with the second radial openings 43 translating with respect to the first radial openings 32 of the sleeve 30, consequently reducing their overlapping and the passage cross-section of the liquid flow in the annular chamber 50, so that a flow rate reduction is caused.

The rigidity of the elastic element 50 determines also a pressure range in which the floating shutter 40 is capable of compensating the pressure difference.

Still referring to the same figures, if the fluid pressure and the momentum thereof decrease, causing a reduction of the liquid flow rate through the valve 10', the elastic element 60 overcomes the opposite force exerted by the fluid on the bottom 22, translating the floating shutter 40 in an opposite direction and increasing the fluid passage cross-section from the first inner chamber 41 to the annular chamber 50, in order to always maintain constant the flow rate about the desired nominal value.

If the momentum of the entering fluid increases, and also the pressure difference between the inlet and outlet increases, they also cause an increase of the fluid flow rate so that the floating shutter 40 is moved to the left and the fluid passage cross-section is shrank so that the increased pressure at the inlet is compensated and the preset flow rate is maintained constant.

If the upstream fluid momentum decreases and/or the downstream pressure increases at the outlet opening 14' of the valve 10', the fluid flow rate decreases. The fluid pressure at the outlet opening 14' is the same as the one inside the second inner chamber 52, since said second inner chamber 52 is always in fluid communication with the outlet opening 14' through the passage 55 (FIGS. 13 and 14).

The fluid pressure in the outlet opening 14' is consequently transmitted into the second inner chamber 52 so that the floating shutter 40 with the elastic element 60 is thrusted to the right in order to increase the fluid cross-section at the first and second radial openings 32, 43, so that a greater amount of fluid is retrieved in the valve 10' and the pressure difference is reduced.

The first sealing elements 90 ensure the operation of the valve 10, 10' by fluidically sealing the rotating shutter 20 from the body 12, while the third sealing element 92 fluidically seals the first and second inner chambers 41, 52.

Still referring to the same figures, the operation of the present valve is innovative with respect to the traditional valves because a force determined by the fluid pressure in the second inner chamber 52 operates on the bottom 42 of the floating shutter 40. Said force determined by the pressure downstream the valve in the outlet opening 14' is added to the force of the elastic element 60 and together they thrust the floating shutter 40 in order to increase the fluid passage cross-section in the annular chamber 50 and a greater amount of liquid is retrieved in the outlet opening 14' from the annular chamber 50, through the first and second openings 22', 15'.

In this configuration, the valve 10' besides operating in dependence of the momentum of the entering fluid flow, also advantageously operates as a function of the pressure difference Δp measured between the pressure of the fluid entering the first inner chamber 41 and pressure of the fluid exiting the second inner chamber 52.

Referring again just to FIG. 15, valve 10, 10' paired with a traditional hydraulic multiway valve or diverter valve 100, such as for example a six way (3+3) valve, enables to manage, by means of a single compact device, the static control and dynamic balancing, at the inlet of a user hydraulic circuit, from two distinct thermal inlet sources, for example hot and cold, which generally require fluid flow rates different from each other.

The valve 10, 10', besides being easily installed and placed on the opening 104 of the multiway valve 100, and having a compact size, enables the operator to pre-regulate the flow rate from distinct thermal sources without disconnecting delivery conduits and manifolds from the openings 104 of the valves. Moreover, the valve 10, 10' enables the operator to advantageously see on the graduated scale 27 of the valve 10, 10' itself, the pre-regulated set of the flow rate through the different openings 104 of the multiway valve 100.

The valve 10, 10', object of the present invention, can be advantageously installed on the openings 104 configured as an inlet from the thermal sources, independently from their position on the multiway valve 100.

The preceding illustration makes clear the advantages obtained by the valve for hydraulic control and balancing of fluid flow rate object of the present invention.

The valve for hydraulic control and balancing of fluid flow rate object of the present invention is particularly advantageous since can be easily installed in very narrow rooms and in general boxes where a high number of conduits and pipes are received, because said valve is geometrically simplified into the shape of a segment or piece of a cylindrical pipe.

Specifically, the easier and smoother installation in narrow rooms of the valve of the present invention makes it particularly convenient when is installed paired with a traditional multiway diverter valve or "six way" valve.

The valve for hydraulic control and balancing of fluid flow rate object of the present invention is also particularly advantageous because enables a user to check it from the outside and adjust the flow rate, for example as a function of changed conditions or extensions of the user plant, without disassembling connecting manifolds and pipes and without the presence of a skilled operator.

A further relevant advantage of the valve for hydraulic control and balancing of fluid flow rate is that it does not have actuating members projecting or protruding above the valve body itself, such as levers, knobs, screw down taps or electromechanical actuators which decrease the available installation space.

A consequent further advantage of the valve for hydraulic control and balancing of fluid flow rate consists of requiring less room or space for maneuvering the control members, levers, knobs, taps, etcetera, because this valve can be easily actuated by acting on only with one finger of the operator.

A further advantage of the valve for hydraulic control and balancing of fluid flow rate of the present invention is that during the hydraulic balancing step, the valve is capable to control the flow rate as a function of the pressure difference between the inlet and outlet openings of the same and not only as a function of the momentum of the liquid fluid which moves the inner balancing members.

Another important advantage due to the valve for hydraulic control and balancing of fluid flow rate is that the same enables a substantial fluid flow rate in comparison with the small outer size due to the low load losses and the c obtained by maintaining the linear direction of the fluid without sudden changes of direction.

A still further advantage of the valve for hydraulic control and balancing of fluid flow rate object of the present invention is due to the fact that while the maneuver members and maneuvering rooms of a traditional valve increase proportionally to the size of the valve, in the valve object of the present invention the same remain constant because it can be easily actuated by only one finger of the operator independently from the size and proportion of the same.

A further advantage of the valve for hydraulic control and balancing of fluid flow rate is due to the fact that the longitudinal size of the valve can remain substantially unchanged even though the valve radial size increases. Further, while in a traditional valve the force required for actuating the control members increases as the valve size increases, by the valve for hydraulic control and balancing of fluid flow rate object of the present invention the force remains constant and the valve can be easily actuated by only one finger of the operator because the lever arm of the operator acting on the irregular surface portion 26 increases as the diametral size of the rotating shutter 20 increases.

While the beforehand described invention was described referring particularly to some preferred embodiments, given in an exemplifying non-limiting way, many modifications and variants will be understood by a person skilled in the art in light of the above discussed description. Therefore, the present invention intends to encompass all the modifications and variants falling in the scope of the attached claims.

The invention claimed is:
1. A fluid flow rate control valve comprising:
a tubular body having an inlet opening, an outlet opening, and an actuating opening that is extending along only a portion of a circumference of the tubular body; and
a rotating hollow shutter rotatively housed inside said tubular body and having a rotation axis, said rotating hollow shutter being adapted to be crossed by a fluid and is configured such that a passage cross-section inside the valve is changeable;
wherein the rotating hollow shutter comprises at least one first eccentric opening rotatively cooperating with at least one mating second eccentric opening formed on an inner wall of said tubular body;
wherein said actuating opening exposes a portion of the rotating hollow shutter and provides access to the portion of the rotating hollow shutter for actuation of the rotating hollow shutter; and
wherein the rotating hollow shutter is such that a rotation of said at least one first eccentric opening with respect to said at least one mating second eccentric opening corresponds to a variation of the passage cross-section in a direction coinciding with the rotation axis of the rotating hollow shutter.

2. The valve according to claim 1, wherein said first eccentric opening is formed in an end face of said rotating hollow shutter, said rotating hollow shutter rotatively facing against said inner wall of the tubular body.

3. The valve according to claim 1, wherein said inner wall is defined by a disk-shaped perforated removable element housed inside the tubular body.

4. The valve according to claim 3, wherein said inner wall is provided with at least one lobed portion mated to a corresponding recess formed inside the tubular body, said at least one lobed portion being such to prevent the inner wall from rotating.

5. The valve according to claim 1, further comprising:
a sleeve housed inside the rotating hollow shutter and defining an annular chamber, said sleeve being provided with at least one first radial opening made on a lateral wall of the rotating hollow shutter, and said sleeve positioned having an end in contact with the bottom of said rotating hollow shutter, and an opposite end of the sleeve facing the inlet opening; and
a floating shutter, slidingly housed inside the sleeve, having a tubular shape, and having an end portion provided with at least one second through radial opening made on the lateral wall of the floating shutter, cooperating and being mated with said first radial opening, said floating shutter defining a first inner chamber and a second inner chamber;
wherein a rotation movement of said second radial opening of the floating shutter with respect to said first radial opening of the sleeve, corresponds to a variation of the passage cross-section proportional to the axial slide of the floating shutter;
wherein said passage cross-section is configured to fluidically connect said annular chamber to the inlet opening of the valve through the first chamber; and
wherein said second inner chamber is fluidically connected to the outlet opening by a passage made through the bottom wall and inner wall.

6. The valve according to claim 5, wherein said sleeve and floating shutter are formed with a goblet shape having a diametral increased cross-section at the corresponding ends facing the inlet opening.

7. The valve according to claim 6, wherein said goblet shape of the sleeve and floating shutter defines a third chamber having a volume adapted to change as the floating shutter axially slides.

8. The valve according to claim 7, comprising one or more drain holes for draining a possible incompressible liquid being trapped between the walls of said third chamber.

9. The valve according to claim 5, further comprising an elastic element disposed in the second inner chamber between the end portion of the floating shutter and the end face of the rotating hollow shutter, said elastic element being configured to hold the floating shutter in a monostable position.

10. The valve according to claim 9, wherein said elastic element is housed in a first recess made on the end face of the rotating hollow shutter and in a second recess made on the end of the bottom of the floating shutter to be stably positioned with respect to the sleeve and floating shutter.

11. The valve according to claim 5, wherein said first and second radial openings comprise a plurality of first and second radial openings formed on the lateral walls of said sleeve and of said floating shutter.

12. The valve according to claim 5, wherein said sleeve is coaxially housed in the rotating hollow shutter by a mouthpiece formed on the end face of the rotating hollow shutter to improve fluid sealing between the annular chamber and second inner chamber.

13. The valve according to claim 1, wherein said rotating hollow shutter is provided with a rough surface portion formed on an annular portion of an outer surface of the rotating hollow shutter at the actuating opening of the tubular body.

14. The valve according to claim 1, wherein said rotating hollow shutter is provided with a scale formed on an annular portion of an outer surface of the rotating hollow shutter at the actuating opening of the tubular body, in cooperation with a nick or reference formed on the tubular body.

15. The valve according to claim 1, further comprising a first spacer housed in said tubular body and having an annular shape, said spacer being adapted to close the inlet opening in order to prevent inner elements from being extracted from the tubular body of the valve.

16. A multiway hydraulic valve or diverter valve comprising:
   a valve body and a plurality of connecting openings; and
   at least one fluid flow rate control valve comprising:
      a tubular body having an inlet opening, an outlet opening, and an actuating opening that is extending along only a portion of a circumference of the tubular body; and
      a rotating hollow shutter rotatively housed inside said tubular body and having a rotation axis, said rotating hollow shutter being crossable by a fluid and configured such that a passage cross-section inside the valve is changeable;
   wherein the rotating hollow shutter comprises at least one first eccentric opening rotatively cooperating with at least one mating second eccentric opening formed on an inner wall of said tubular body;
   wherein said actuating opening exposes a portion of the rotating hollow shutter and allows access to the portion of the rotating hollow shutter for actuation of the rotating hollow shutter; and
   wherein said rotating hollow shutter is configured so that a rotation of said at least one first eccentric opening with respect to said at least one mating second eccentric opening corresponds to a variation of the passage cross-section in a direction coinciding with the rotation axis of the rotating hollow shutter.

* * * * *